J. R. EAGLE.
BRUSH CUTTING MACHINE.
APPLICATION FILED FEB. 27, 1912.
1,068,576.
Patented July 29, 1913.
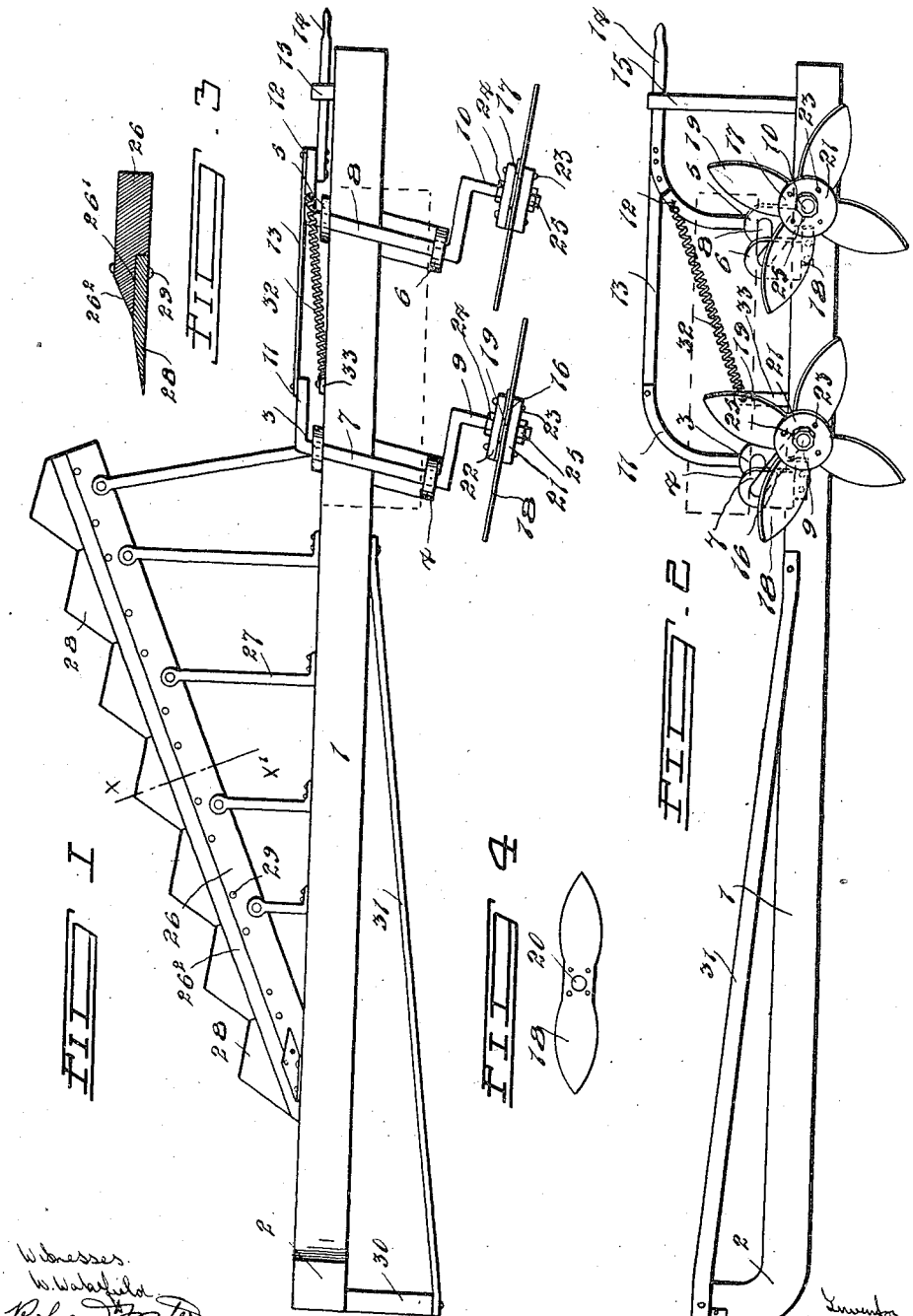

UNITED STATES PATENT OFFICE.

JOHN ROBERT EAGLE, OF GILBERT PLAINS, MANITOBA, CANADA.

BRUSH-CUTTING MACHINE.

1,068,576.  Specification of Letters Patent.  Patented July 29, 1913.

Application filed February 27, 1912.  Serial No. 680,253.

*To all whom it may concern:*

Be it known that I, JOHN ROBERT EAGLE, of the village of Gilbert Plains, in the Province of Manitoba, Canada, have invented certain new and useful Improvements in Brush-Cutting Machines, of which the following is the specification.

My invention relates to a machine for cutting brush, and the object of the invention is to provide an inexpensive, efficient, and durable machine of this class which can be controlled completely by a single operator and will cut brush clean from the field.

It consists essentially in an inner or main beam, an angularly disposed beam carried by the main beam, knives located on the angularly disposed beam, rear cross shafts having cranked ends, rotatable members mounted on the ends of the cross shafts, and means for swinging the cross shaft, the parts being arranged and constructed as hereinafter more particularly described.

Figure 1 is a plan view of the machine. Fig. 2 is a side elevation of the same. Fig. 3 is a vertical sectional view through the angularly disposed beam, the section being taken in the plane denoted by the line X X′, Fig. 1. Fig. 4 is a side elevation of a portion of one of the supporting members.

In the drawing like characters of reference indicate corresponding parts in each figure.

1 represents the main beam or runner, which has its forward end formed into a shoe 2 for riding over the ground, and its rear end supplied with pairs of brackets 3 and 4, 5 and 6, carrying angularly disposed cross shafts 7 and 8 provided with cranked ends 9 and 10, on which are mounted rotatable members shortly described. The opposite ends of the shafts are bent to form levers 11 and 12, which levers are united by a connecting link 13 fastened to the parts by pivot pins. The lever 12 can be extended backwardly if desired to form a handle for turning the shafts, but in the present instance I have fastened to it a handle 14 which is adapted to pass behind the hooked band of a catch bar 15 extending upwardly from the rear end of the main beam when the machine is operating.

16 and 17 are the rotatable members hereinbefore mentioned which are formed in the following manner: Two double winged blades 18 and 19 are provided centrally with openings 20 which are adapted to slide on the cranked ends of the shafts 7 and 8. Disks 21 and 22 are placed at each side of the blades and are provided with bolts 23, which pass through the blades and secure them permanently to the disks. Collars 24 are fixed on the cranked ends of the shaft and bear against the inner faces of the inner disks, while nuts 25 hold the rotatable members on the shafts. 26 is an angularly disposed beam permanently secured to the forward end of the main beam and having its outer lower corner rabbeted away at 26′ and the adjoining edge beveled at $26^2$. 27 are braces extending between the beams and reinforcing the structure. 28 are knives fitted within the rabbeted corner of the beam 26, and secured to it by rivets 29. The knives have their cutting edges more or less V-shaped in form as best shown in Fig. 1 of the drawing. 30 is a draw bar secured to the shoe, and 31 is a brace bar extending between the draw bar and the beam 1. 32 is a spiral spring secured to the rear lever 12 at one end, and to a short standard 33 extending upwardly from the side of the beam 1 at the other end.

It is to be understood that the machine is drawn forwardly by suitable draft animals attached to the draw bar 30. The angular disposition of the members 16 and 17 equalizes the draft when the knives are cutting and keeps the implement up to the work as will be readily apparent.

I wish to point out that various modifications may be used pertaining to the knives, their connection to the beam, and the rotatable members, but I desire it to be distinctly understood that the modifications come under the scope of the appended claims, and are accordingly considered embodied in the present invention.

Although I have shown two angularly disposed cross shafts supplied with rotatably mounted members to hold the machine up to the work, still I do not wish to limit myself to the precise number of these as one or more could be used. If desired also the open space appearing between the main beam or runner and the angularly disposed beam could be closed over by a sheet metal plate.

What I claim as my invention is:

1. In an implement of the class described, the combination comprising a main beam provided forwardly with a shoe, an angularly disposed beam secured to the main beam, knives carried by the angularly disposed beam, and angularly disposed rotatable members carried by the main beam and adapted to cut into the ground over which the implement is operating, as and for the purpose specified.

2. In an implement of the class described, the combination comprising a main beam provided forwardly with a shoe, an angularly disposed beam secured to the angular main beam, angularly disposed crank shafts mounted on the main beam, members rotatably mounted on the crank shafts at the opposite side of the main beam to the angularly disposed beam, and means for holding the crank shafts in set position, as and for the purpose specified.

3. In an implement of the class described, the combination comprising a main beam, angularly disposed knives located at one side of the main beam and angularly disposed rotatable members located at the opposite side of the beam and adapted to cut into the ground over which the implement is operating, as and for the purpose specified.

4. In an implement of the class described, the combination comprising a main beam supplied forwardly with a shoe, an angularly disposed beam secured to the main beam, and reinforced by braces, cutting knives secured to the angularly disposed beam, angularly disposed shafts rotatably mounted on the main beam and having their ends cranked, members rotatably mounted on the cranked ends of the shafts, said members being adapted to cut into the ground over which the implement is operating, and means for controlling the position of the shafts, as and for the purpose specified.

5. In an implement of the class described, the combination comprising a main beam provided forwardly with a shoe, an angularly disposed beam secured to the forward end of the main beam and reinforced by braces, V-shaped cutting knives secured to the angularly disposed beam, angularly disposed shafts rotatably mounted on the rear portion of the main beam and having the ends at the opposite side of the main beam to that of the knives, cranked, rotatable members mounted on the cranked ends of the shafts adapted to cut into the ground over which the implement is operating, and a handle controlling the movement of the crank shafts, as and for the purpose specified.

6. In an implement of the class described, the combination comprising a main beam provided forwardly with a shoe, an angularly disposed beam secured to the main beam forwardly and reinforced by braces beam forwardly and reinforced by braces knives presenting V-shaped cutting edges secured to the angularly disposed beam, a set of angularly disposed shafts rotatably mounted on the rear end of the main beam, said shafts having the ends adjoining the angularly disposed beam formed into levers, and the ends remote, cranked, rotatable members mounted on the cranked ends of the shafts and adapted to cut into the ground over which the implement is operating, a link connecting the lever ends of the shafts, a handle secured to the rear lever, and a hooked catch bar secured to the rear end of the main beam adapted to receive and hold a handle, as and for the purpose specified.

Signed at Gilbert Plains, in the Province of Manitoba, this 27th day of July, 1911.

JOHN ROBERT EAGLE.

In the presence of—
GEORGINA McLEAN,
W. J. PORTER.

---

Copies of this patent may be obtained for five cents each, by addressing the "Commissioner of Patents, Washington, D. C."